United States Patent
Noguchi

(10) Patent No.: US 11,662,499 B2
(45) Date of Patent: May 30, 2023

(54) FOREIGN OBJECT DETECTING DEVICE

(71) Applicant: FANUC CORPORATION, Minamitsuru-gun (JP)

(72) Inventor: Yoshiaki Noguchi, Yamanashi-ken (JP)

(73) Assignee: FANUC CORPORATION, Minamitsuru-gun (JP)

(*) Notice: Subject to any disclaimer, the term of this patent is extended or adjusted under 35 U.S.C. 154(b) by 280 days.

(21) Appl. No.: 16/912,207

(22) Filed: Jun. 25, 2020

(65) Prior Publication Data

US 2021/0003736 A1 Jan. 7, 2021

(30) Foreign Application Priority Data

Jul. 2, 2019 (JP) .............................. JP2019-123443

(51) Int. Cl.
| | |
|---|---|
| *G01V 5/00* | (2006.01) |
| *G06T 7/00* | (2017.01) |
| *F16P 3/12* | (2006.01) |
| *G05B 19/401* | (2006.01) |

(52) U.S. Cl.
CPC .............. *G01V 5/0008* (2013.01); *F16P 3/12* (2013.01); *G05B 19/401* (2013.01); *G06T 7/0008* (2013.01); *G06T 2207/30232* (2013.01)

(58) Field of Classification Search
CPC .............. G05B 19/401; F16P 3/00; F16P 3/12
See application file for complete search history.

(56) References Cited

U.S. PATENT DOCUMENTS

| | | | | |
|---|---|---|---|---|
| 5,602,428 | A | * 2/1997 | Schultz | ..................... F16P 3/12 307/119 |
| 2006/0082465 | A1 | * 4/2006 | Grzan | ................... H01H 3/141 340/665 |
| 2014/0067121 | A1 | * 3/2014 | Brooks | .................. B25J 9/1676 700/255 |
| 2015/0158178 | A1 | * 6/2015 | Burmeister | ........... G06T 1/0014 382/203 |
| 2016/0224013 | A1 | 8/2016 | Endou | |
| 2017/0305019 | A1 | * 10/2017 | Pomrehn | .................. B25J 19/06 |

(Continued)

FOREIGN PATENT DOCUMENTS

| | | | |
|---|---|---|---|
| CN | 204868914 U | * 12/2015 | |
| CN | 109519689 A | * 3/2019 | |
| CN | 109314859 B | * 9/2021 | ................ F16P 3/08 |

(Continued)

OTHER PUBLICATIONS

Japanese Office Action, dated Jan. 17, 2023, in Japanese Application No. 2019-123443, with English Translation thereof.

*Primary Examiner* — Ronald D Hartman, Jr.

(74) *Attorney, Agent, or Firm* — McGinn I.P. Law Group, PLLC.

(57) ABSTRACT

A foreign object detecting device includes: an input unit to which a detection signal is inputted from a sheet-type pressure sensor; a sensor information processing unit configured to, based on the detection signal, generate sensor information indicating an area in a detection area of the pressure sensor to which a pressure is being applied; and a judgement unit configured to compare the sensor information and basic layout information indicating a predetermined area in the detection area to which a pressure is applied, to thereby judge whether a foreign object is present in the detection area.

14 Claims, 8 Drawing Sheets

(56) References Cited

U.S. PATENT DOCUMENTS

2020/0272123 A1\* 8/2020 Denenberg .............. G06T 17/00

FOREIGN PATENT DOCUMENTS

| DE | 102018000790 A1 | * | 8/2018 | |
|----|----|----|----|----|
| EP | 3182236 A1 | * | 6/2017 | ............. B65B 19/02 |
| EP | 3741506 A1 | * | 11/2020 | ......... B23Q 11/0082 |
| JP | S63-268093 A | | 11/1988 | |
| JP | 2015-168339 A | | 9/2015 | |
| JP | 2016-143273 A | | 8/2016 | |
| WO | WO-2019231798 A1 | * | 12/2019 | ............. E21B 19/08 |

\* cited by examiner

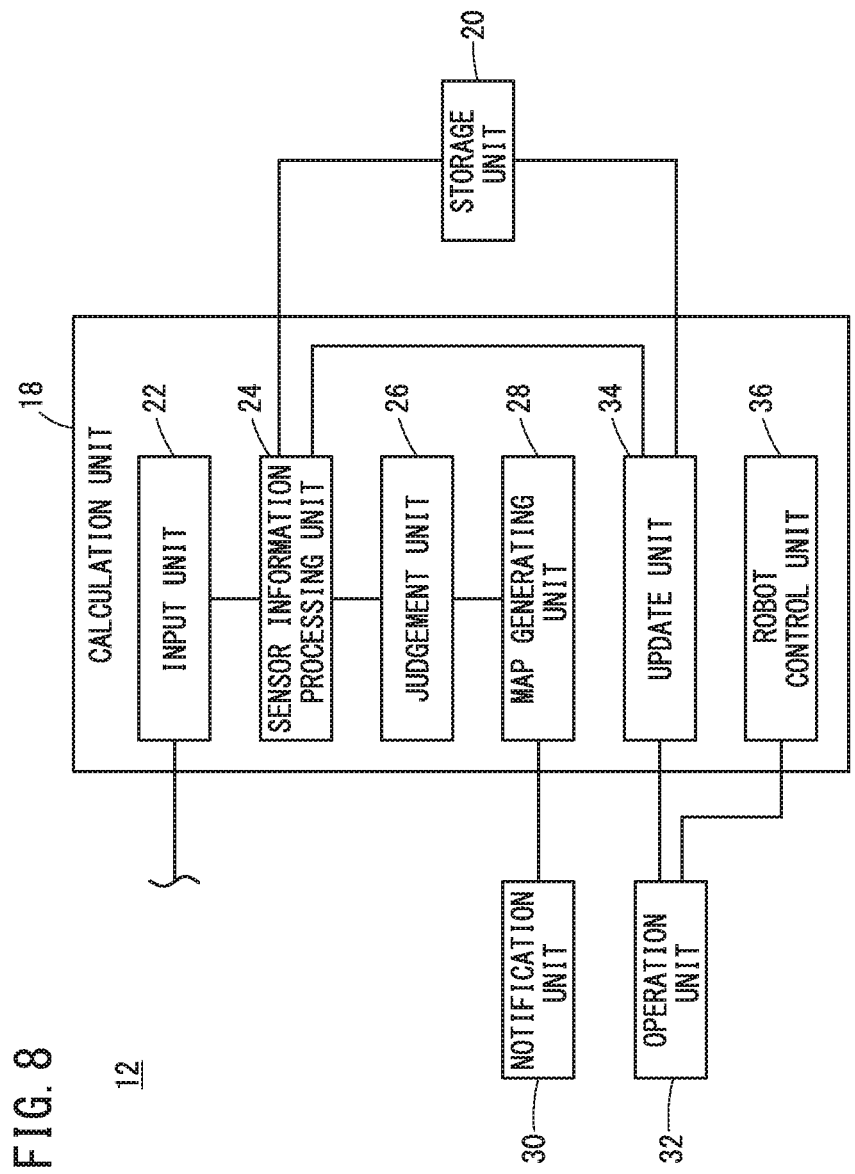

FOREIGN OBJECT DETECTING DEVICE

CROSS-REFERENCE TO RELATED APPLICATION

This application is based upon and claims the benefit of priority from Japanese Patent Application No. 2019-123443 filed on Jul. 2, 2019, the contents of which are incorporated herein by reference.

BACKGROUND OF THE INVENTION

Field of the Invention

The present invention relates to a foreign object detecting device for detecting a foreign object.

Description of the Related Art

Japanese Laid-Open Patent Publication No. 2016-143273 discloses a machining system including a machine tool, a robot, and a worker detecting device. In the machining system disclosed, the worker detecting device detects whether any worker is present in a dangerous area. Then, if some worker is present in the dangerous area, the machining system restricts operations of the machine tool and robot to ensure the safety of the worker.

SUMMARY OF THE INVENTION

As well as thus restricting operations of the industrial machinery (machine tool and robot) when some worker is present in the vicinity, it is also desirable for safety to ensure the absence of workers in the vicinity before starting operations of the industrial machinery.

Some worker may perform maintenance work of, or attach a workpiece to, the industrial machinery between sessions carried out by the industrial machinery. However, after performing maintenance work or installation of a workpiece, the worker may leave some tool or tool stand around the industrial machinery. Restarting the industrial machinery with a foreign object left behind therearound is undesirable since it may lead to an accident or breakage.

Accordingly, an object of the present invention is to provide a foreign object detecting device for detecting a foreign object present in a given area.

According to an aspect of the present invention, a foreign object detecting device includes: an input unit to which a detection signal is inputted from a sheet-type pressure sensor; a sensor information processing unit configured to, based on the detection signal inputted to the input unit, generate sensor information indicating an area in a detection area of the pressure sensor to which a pressure is being applied; and a judgement unit configured to compare the sensor information and basic layout information indicating a predetermined area in the detection area to which a pressure is applied, to thereby judge whether a foreign object is present in the detection area.

The present invention provides a foreign object detecting device for detecting a foreign object present in a given area.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 8 is a schematic configuration diagram of a foreign object detecting device according to a fourth modification.

DESCRIPTION OF THE PREFERRED EMBODIMENTS

The foreign object detecting device according to the present invention will be described in detail in connection with preferred embodiments while referring to the accompanying drawings.

Embodiment

Figure 1:
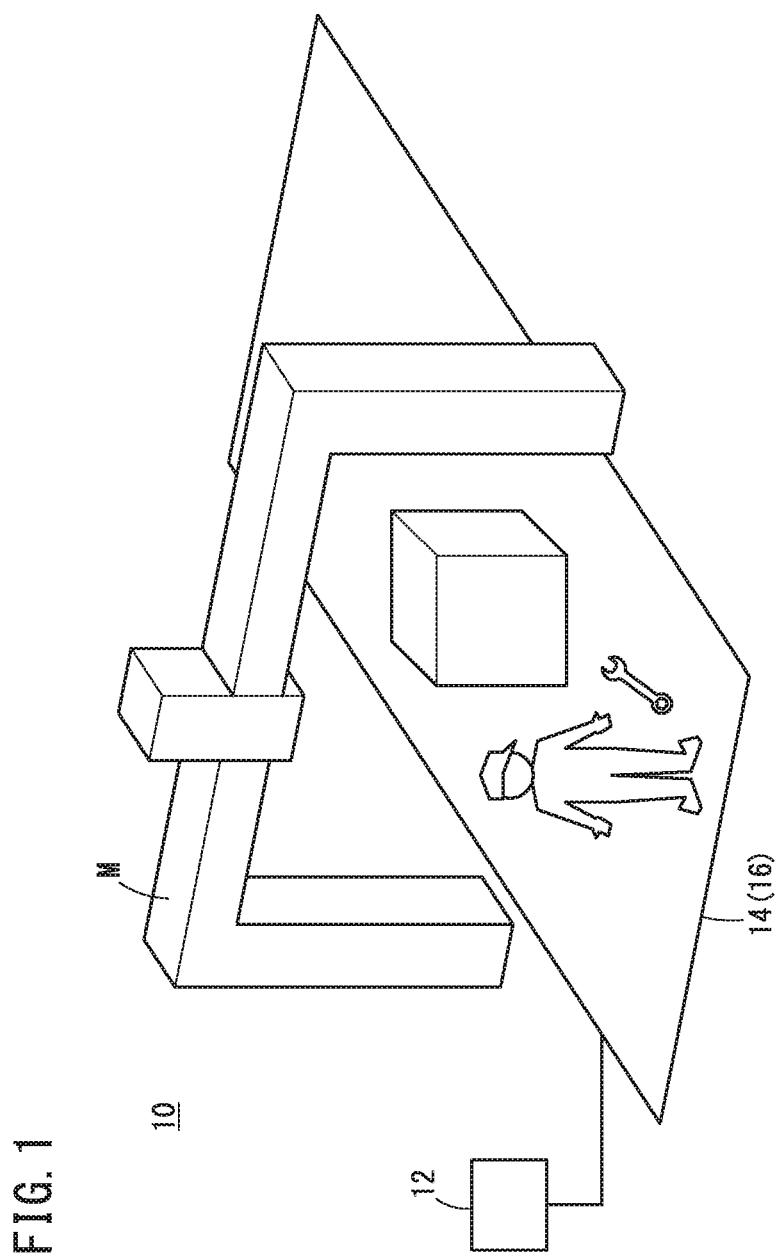
FIG. 1 is a schematic configuration diagram illustrating a foreign object detecting system according to an embodiment.
Figure 2:
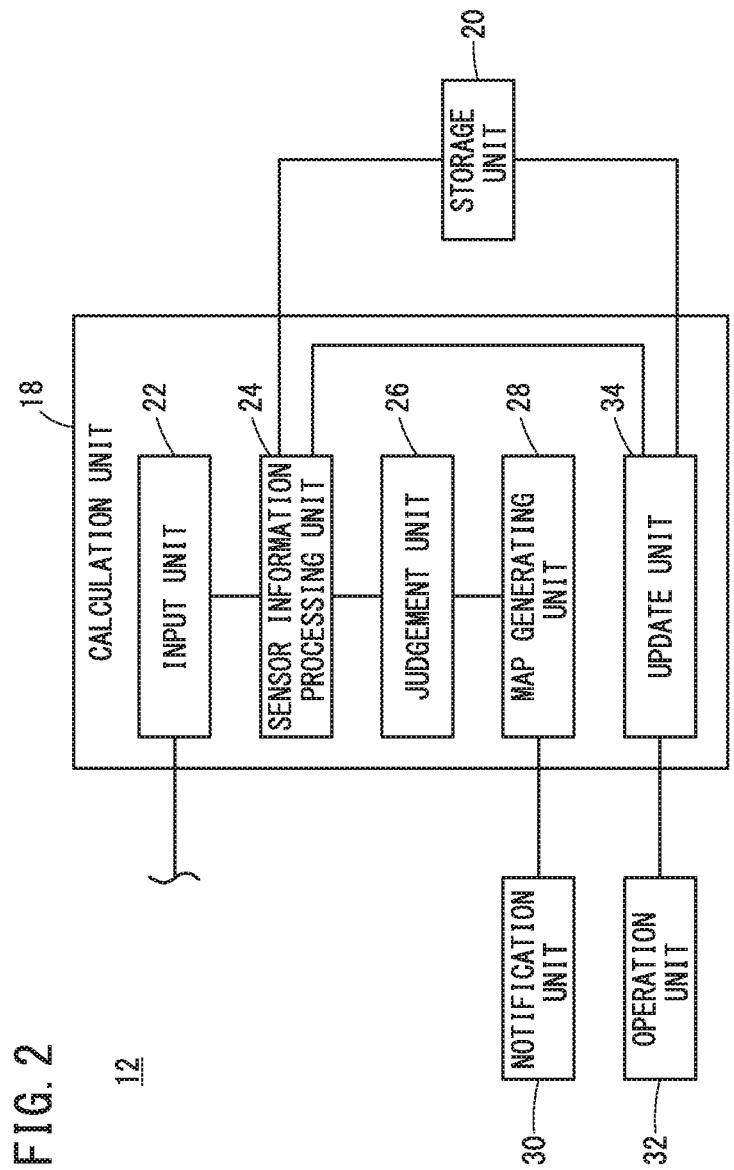
FIG. 2 is a schematic configuration diagram of a foreign object detecting device of the embodiment.

FIG. 1 is a schematic configuration diagram of a foreign object detecting system 10 according to an embodiment. FIG. 2 is a schematic configuration diagram of a foreign object detecting device 12 of the embodiment.

The foreign object detecting system 10 includes the foreign object detecting device 12, and a sheet-type pressure sensor 14 connected to the foreign object detecting device 12. The foreign object detecting device 12 and the pressure sensor 14 may be connected either by wire or by wireless.

The sheet-type pressure sensor 14 is laid out on the floor (factory floor) of the site where industrial machinery M operates. "The site where industrial machinery (M) operates" can be the interior of a certain room sectioned in a factory, for example. In this embodiment, the wording "industrial machinery (M)" is used as a generic term indicating machine tools and work robots. The industrial machinery M that will be explained as an example in this embodiment is assumed to be a machine tool for machining a workpiece.

The given area (detection area) 16 in which the pressure sensor 14 is laid out is a work space of the industrial machinery M, where a workpiece to be machined by the industrial machinery M may be placed, and a worker may come in to do some work related to the industrial machinery M. The pressure sensor 14 receives a pressure from a workpiece placed thereon or from a worker present thereon. On the basis of the magnitude and region of the pressure applied thereto, the pressure sensor 14 outputs to the foreign object detecting device 12 a signal that will be referred to as "detection signal" in this embodiment.

In this embodiment, the foreign object detecting device 12 is a calculation device including a calculation unit (processor) 18 and a storage unit (memory) 20. The foreign object detecting device 12 may be installed in the same room as the pressure sensor 14, or may be installed in a different room from the pressure sensor 14. The foreign object detecting device 12 includes an input unit 22, a sensor information processing unit 24, a judgement unit 26, a map generating unit 28, a notification unit 30, an operation unit 32, and an update unit 34. These components will be described below sequentially.

The input unit 22 is connected to the pressure sensor 14 to receive the detection signal as input. On the basis of the detection signal inputted to the input unit 22, the sensor information processing unit 24 generates sensor information indicating areas in which a pressure is being applied, in the detection area 16 of the pressure sensor 14. As the sensor information processing unit 24 generates the sensor information, the areas of the objects present in the detection area 16 are calculated (their positions and base areas).

In this embodiment, "objects", and "foreign objects" which will be described later, can include living things (humans and animals). The sensor information generated by the sensor information processing unit 24 is outputted to the judgement unit 26.

The judgement unit 26 compares the sensor information and basic layout information indicating predetermined areas of the detection area 16 to which pressure is applied, so as to judge whether any foreign object is present in the detection area 16. The basic layout information is information that indicates the arrangement of workpieces, peripheral equipment, other objects and devices that are regarded as necessary items to be placed in the detection area 16 when the industrial machinery M machines workpieces. It is assumed herein that the basic layout information is stored in the storage unit 20 in advance.

Having compared the basic layout information and sensor information, the judgement unit 26 judges that a foreign object is present if the difference between the two does not fall within an allowable margin of error. When the judgement unit 26 has judged that some foreign object is present, it outputs to the map generating unit 28 information indicating the region in which the foreign object is present.

When the judgement unit 26 judges that a foreign object is present, the map generating unit 28 generates a foreign object map that graphically shows the area where the foreign object is present in the detection area 16. In this embodiment, it is assumed that the foreign object map shows the area of the object that has been judged as a foreign object, without showing the areas of objects that are contained in the basic layout information in advance. That is, the map generating unit 28 of this embodiment generates a foreign object map that shows only the difference between the sensor information and the basic layout information. This prevents the foreign object map from being a complicated diagram. The generated foreign object map is outputted to the notification unit 30.

In this embodiment, the notification unit 30 is a display device having a screen. When the judgement unit 26 has judged that a foreign object is present, the notification unit 30 displays on the screen the foreign object map generated by the map generating unit 28, so as to notify the operator of the presence of the foreign object in the detection area 16. This allows the operator to easily recognize that a foreign object is present in the detection area 16 by checking the foreign object map displayed by the notification unit 30.

Now, the operator may check the foreign object map to find that the foreign object of notification is actually an object that can be there without any problems. This can be, for example, a situation where the object has been reasonably placed in an area different from the predetermined area in the basic layout information, on the basis of an appropriate decision made at the site.

The operator can teach the foreign object detecting device 12 through the operation unit 32 that the presence of that foreign object does not cause any problems. The operation unit 32 is, for example, a mouse, a keyboard, or a touch panel attached to the screen of the notification unit 30. The contents given through the operation unit 32 are inputted to the update unit 34.

Then, based on the teaching by the operator and the sensor information, the update unit 34 updates the basic layout information in such a manner as to reflect therein the area of the foreign object that has been indicated as having no problem by the operator through the operation unit 32. In this way, the operator can include the area of that foreign object, whose presence he or she has reported as having no problem, in the basic layout information as a predetermined area.

The update unit 34 causes the storage unit 20 to store the updated basic layout information. After this, the judgement unit 26 makes the above-mentioned judgement using the updated basic layout information. This is an example of the configuration of the foreign object detecting device 12.

The foreign object detecting device 12 described above may serve also as a control device (CNC) for controlling operations of the industrial machinery M. In this case, the foreign object detecting device 12 may further include a control unit for controlling the industrial machinery M. This configuration allows the operator to carry out both the industrial machinery M control and the foreign object detection collectively by using the foreign object detecting device 12 (CNC).

In connection with the implementation where the foreign object detecting device 12 serves also as a CNC, the foreign object detecting device 12 may be further configured to limit or stop operation of the industrial machinery M if the presence of a foreign object is detected after the industrial machinery M has been started, for example. It is then possible to ensure the safety of the site both before and after the start of operation of the industrial machinery M.

Figure 3:
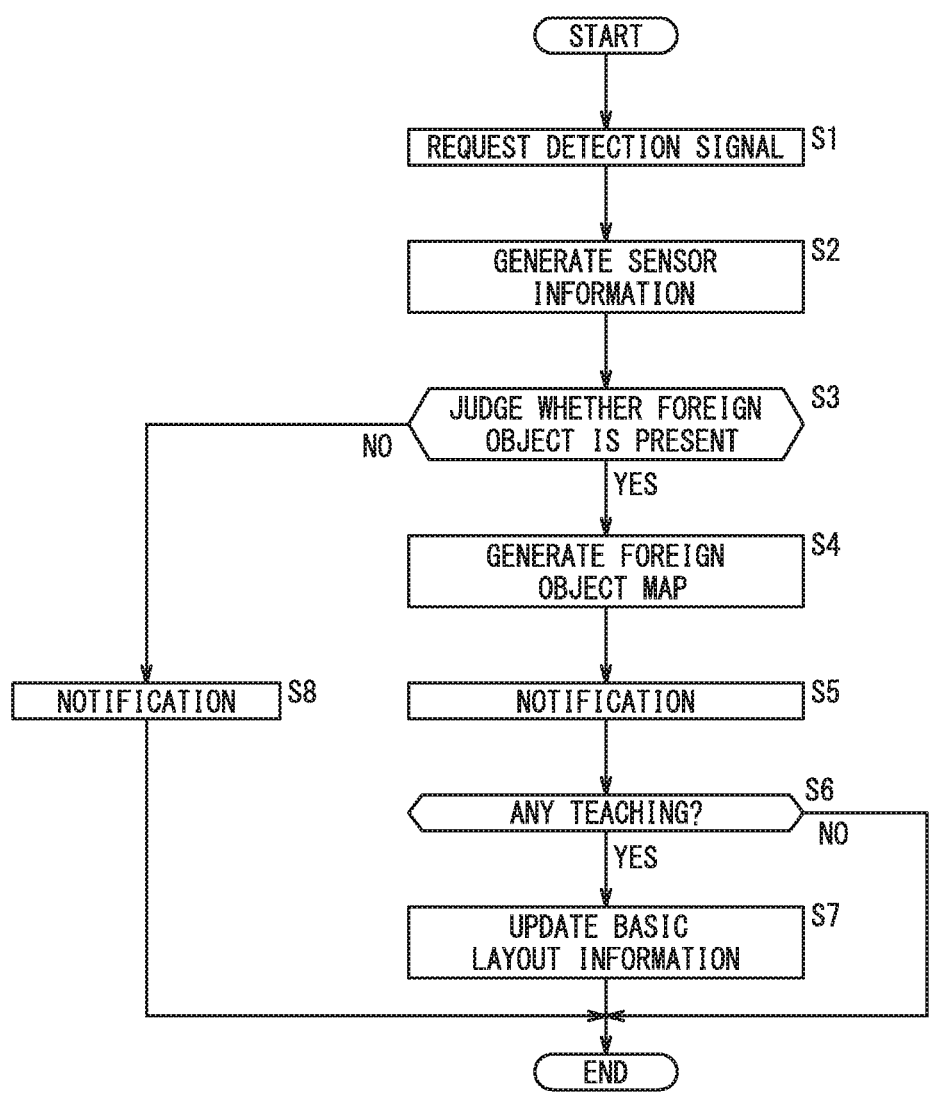
FIG. 3 is a flowchart showing an example of a foreign object detecting process.

FIG. 3 is a flowchart showing an example of the foreign object detecting process.

The foreign object detecting process (foreign object detecting method) executed by the above-described foreign object detecting device 12 will be explained referring to FIG. 3.

When the foreign object detecting process is started (START), the foreign object detecting device 12 first requests the sheet-type pressure sensor 14 to output the detection signal (step S1). The detection signal is thus inputted to the input unit 22 from the pressure sensor 14. The foreign object detecting process may start in response to an instruction from the operator, or may automatically start when a previously designated time has come, for example.

Next, based on the input detection signal, the sensor information processing unit 24 generates sensor information (step S2). Then, based on the generated sensor information and the basic layout information stored beforehand in the storage unit 20, the judgement unit 26 judges whether any foreign object is present (step S3).

Figure 4:
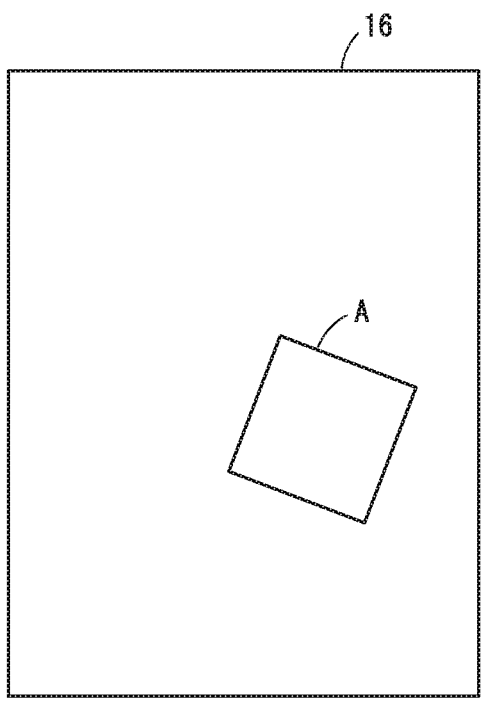
FIG. 4 shows an example of basic layout information stored in a storage unit.
Figure 5:
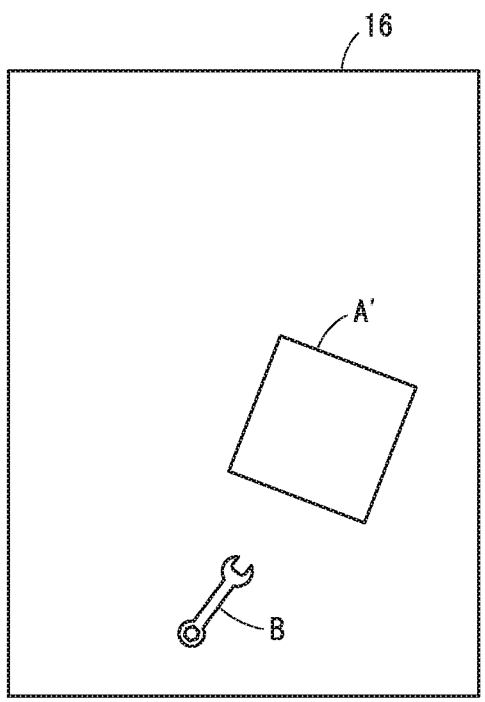
FIG. 5 shows an example of sensor information generated by a sensor information processing unit.

FIG. 4 shows an example of the basic layout information stored in the storage unit 20. FIG. 5 shows an example of the sensor information generated by the sensor information processing unit 24.

For example, suppose that the basic layout information is as shown in FIG. 4 and the sensor information has been generated as shown in FIG. 5. In FIG. 4, the area A is a predetermined area where a workpiece is to be placed. In FIG. 5, the area A' is an area that has been detected when the workpiece has been actually placed there. It is assumed here that the positions and base areas of the area A and the area A' are within the allowable margin of error. In FIG. 5, the area B is an area that has been detected because a tool (wrench) was left behind in the detection area 16.

The judgement unit 26 recognizes the presence of the area B that does not correspond to the area predetermined in the basic layout information, and judges that a foreign object is present in the detection area 16.

Figure 6:
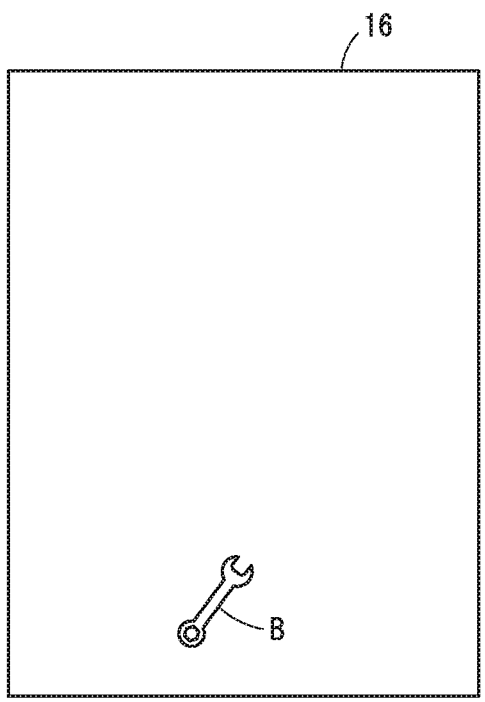
FIG. 6 shows an example of a foreign object map generated by a map generating unit.

FIG. 6 shows an example of the foreign object map generated by the map generating unit 28.

When a judgement indicative of the presence of a foreign object is made (step S3: YES), the map generating unit 28 generates a foreign object map (step S4). The map generating unit 28 generates a foreign object map (FIG. 6) showing the area B being the difference between the basic layout information and the sensor information, based on the result of judgement inputted from the judgement unit 26. When a judgement indicative of the absence of any foreign object is made (step S3: NO), the notification unit 30 makes notification of the absence of foreign object (step S8) and the process terminates (END).

Next, the notification unit 30 displays the foreign object map generated in step S4 on the screen, to thereby notify the operator of the presence of the foreign object (step S5). The operator checks the foreign object map to easily recognize the presence of the area B (a tool left behind) in the detection area 16. The notification unit 30 may display on the screen a message indicative of the presence of the foreign object in the detection area 16 together with the foreign object map.

Next, the foreign object detecting device 12 determines whether any teaching has been given from the operator through the operation unit 32 (step S6). As has already been explained, if the presence of the object judged as a foreign object does not matter, the operator can teach the fact to the foreign object detecting device 12.

Figure 7:
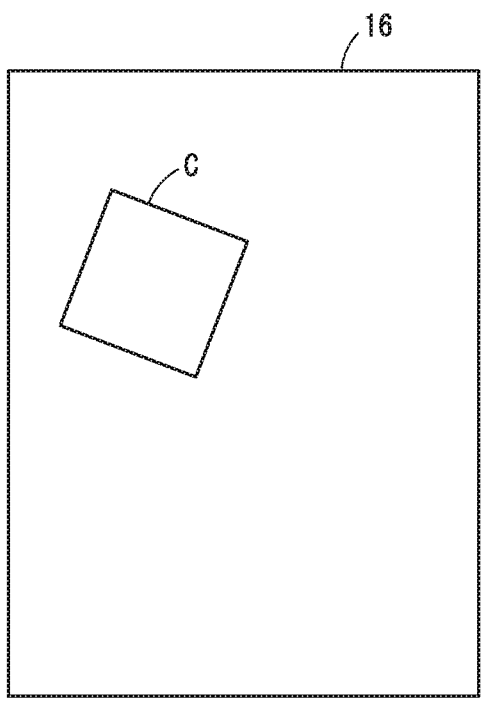
FIG. 7 shows another example of the foreign object map, different from that of FIG. 6, generated by the map generating unit.

FIG. 7 shows another example, different from that of FIG. 6, of the foreign object map generated by the map generating unit 28.

Now, step S6 will be explained assuming that the basic layout information is as shown in FIG. 4 and the map generating unit 28 has generated the foreign object map as shown in FIG. 7. Suppose that the area C in FIG. 7 is an area that has been detected because the workpiece to be placed e.g., in the area A according to the basic layout information (FIG. 4) has been placed reasonably in the position different from the area A.

Suppose that the operator has judged that the presence of the area C has no problem. The operator then operates the operation unit 32 (e.g. mouse) to move the cursor on the screen of the notification unit 30 to select the area C, so as to teach the foreign object detecting device 12 that the presence of the area C does not matter.

Next, when the teaching has been given from the operator (step S6: YES), the update unit 34 updates the basic layout information on the basis of the teaching (step S7). The area C is thus included in the basic layout information as a predetermined area. At this time, the operator may instruct the update unit 34 to delete the area A from the basic layout information, on the grounds that the area A is unnecessary in the basic layout information. The basic layout information is thus updated from the contents of FIG. 4 to the contents of FIG. 7.

The update unit 34 causes the storage unit 20 to store the updated basic layout information. The step S7 thus finishes. After this, when the foreign object detecting device 12 executes step S3 again, the judgement is made based on the basic layout information (FIG. 7) updated in this step S7.

When step S7 has finished, or when there is no teaching from the operator (step S6: NO), the foreign object detecting device 12 terminates the foreign object detecting process (END).

The description above has shown an example of the flow of foreign object detecting process. The foreign object detecting process is not limited to the implementation above. For example, though the description above has illustrated that the foreign object detecting device 12 requests the pressure sensor 14 to provide the detection signal at step S1, the pressure sensor 14 may output the detection signal in succession without being requested. In this case, the foreign object detecting device 12 may skip step S1 and start the foreign object detecting process from step S2.

MODIFICATIONS

The embodiments have been described as examples of the present invention and the embodiments above can of course be modified or improved in various manners. It is clear from the recitation of claims that such modified or improved embodiments are also included in the technical scope of the present invention.

First Modification

The map generating unit 28 of the embodiment generates a foreign object map that indicates only the difference between the sensor information and the basic layout information. The invention is not limited to this implementation but the map generating unit 28 may generate a foreign object map that indicates both of the area where the foreign object is present and the predetermined areas in the basic layout information. In this case, the notification unit 30 may display the foreign object map in such a manner that the area of the foreign object and the predetermined areas can be distinguished from each other.

Specific method for displaying the area of the foreign object and the predetermined areas in a distinguishable manner is not particularly limited. Examples thereof include, but are not limited to, a method in which the area where the foreign object is present is displayed in a flashing on and off manner, a method in which that area is displayed in a given color, or a method in which a given message is displayed together with that area.

In this way, the operator can easily notice whether and where a foreign object is present, including where a plurality of objects are positioned relative to each other in the detection area 16.

Second Modification

The storage unit 20 may store therein an estimation table in which areas of foreign objects and the kinds of foreign objects are associated with each other. The foreign object detecting device 12 may further include an estimation unit configured to, when the judgement unit 26 judges the presence of a foreign object, estimate the kind of that foreign object by referring to the estimation table. In this case, the notification unit 30 may make notification of the kind of foreign object estimated by the estimation unit.

"The kinds of foreign objects" that can be defined in this modification can be determined or changed suitably, but examples thereof include "industrial machinery M", "workpiece", "tool", and "worker". The categories may be subdivided to define, for example, "collapsed worker (injured person)".

This allows the operator further to easily understand the kind of foreign object by the notification made by the notification unit 30. This modification can thus allow the operator to check for foreign objects still faster and more efficiently.

For example, suppose that the judgement unit 26 has judged the presence of a foreign object and the estimation unit has estimated that the kind of that foreign object is "collapsed worker (injured person)". Then, the operator receives the notification from the notification unit 30 that an injured person is present on the site, and can promptly start working to stop the industrial machinery M or to call for a rescue to the outside of the site.

The estimation table above may be updated according to teachings from the operator. This enables the foreign object detecting device 12 to gradually improve the accuracy of estimation every time the estimation table is updated.

The teachings provided by the operator to update the estimation table are not limited to indication of the kinds of foreign objects. For example, in the case where a fence or wall is provided on the site and the detection area 16 includes an area which no one can enter, then the operator may teach the fact to the foreign object detecting device 12. Then, after that, the foreign object detecting device 12 will not estimate a foreign object detected in that area as being a human, which improves the accuracy of estimation.

Third Modification

In connection with the second modification, the estimation table may associate together regions where foreign objects are present, magnitudes of pressure in the regions to which the pressure is being applied, and the kinds of foreign objects.

This enables the estimation unit to estimate the kind of foreign object more accurately.

Fourth Modification

FIG. 8 is a schematic configuration diagram of a foreign object detecting device 12 according to a fourth modification.

The embodiment has explained that the foreign object detecting device 12 may serve also as a CNC. In connection with this configuration, the foreign object detecting device 12 may include a robot control unit 36 configured to control a robot (transfer robot) for transferring a foreign object out of the detection area 16.

The transfer robot may be, for example, a "robot with an arm" or "crane robot" provided separately from the industrial machinery M for machining workpieces. The transfer robot holds a foreign object with an arm or crane and transfers it out of the detection area 16. The operator can then easily remove the foreign object from the detection area 16 by instructing the transfer robot to transfer the foreign object.

Considering from a safety aspect, it is desired that the transfer of a foreign object by the transfer robot be performed only when the foreign object is not a human (living thing). From this point of view, this modification may incorporate the second or third modification described above. Then, since the foreign object detecting device 12 estimates the kind of foreign object and notifies the operator about it, the operator can efficiently judge whether the detected foreign object is of a kind that can be transferred by the transfer robot.

Invention Obtained from Embodiments

The invention graspable from the embodiments and modifications above will be recited below.

The foreign object detecting device (12) includes: the input unit (22) to which a detection signal is inputted from the sheet-type pressure sensor (14); the sensor information processing unit (24) configured to, based on the detection signal inputted to the input unit (22), generate sensor information indicating an area in the detection area (16) of the pressure sensor (14) to which a pressure is being applied; and the judgement unit (26) configured to compare the sensor information and basic layout information indicating a predetermined area in the detection area (16) to which a pressure is applied, to thereby judge whether a foreign object is present in the detection area (16).

A foreign object detecting device (12) is thus provided which detects a foreign object present in the detection area (16).

The foreign object detecting device (12) may further include the notification unit (30) configured to, when the judgement unit (26) judges that the foreign object is present, notify an operator that the foreign object is present in the detection area (16). This configuration enables the operator to easily grasp the presence of the foreign object in the detection area (16).

The foreign object detecting device (12) may further include the map generating unit (28) configured to, when the judgement unit (26) judges that the foreign object is present, generate a foreign object map that graphically shows the area where the foreign object is present in the detection area (16), wherein the notification unit (30) may be configured to display the foreign object map. Thus, the operator can easily recognize the presence of the foreign object in the detection area (16) by checking the foreign object map displayed by the notification unit (30).

The map generating unit (28) may be configured to generate a foreign object map that only shows a difference between the sensor information and the basic layout information. This prevents the foreign object map from being a complicated diagram.

The map generating unit (28) may be configured to generate the foreign object map that shows both of the area where the foreign object is present and the predetermined area in the basic layout information, and the notification unit (30) may be configured to display the foreign object map in a manner that the area where the foreign object is present and the predetermined area is distinguishable from each other. Thus, the operator can easily notice whether and where the foreign object is present, including where multiple objects are positioned relative to each other in the detection area (16).

The foreign object detecting device (12) may further include: the storage unit (20) storing an estimation table in which the area where the foreign object is present and the kind of the foreign object are associated with each other; and the estimation unit configured to, when the judgement unit (26) judges that the foreign object is present, estimate the kind of the foreign object by referring to the estimation table, wherein the notification unit (30) may be configured to make notification of the kind of foreign object estimated by the estimation unit. Thus, the operator can further understand the kind of the foreign object with ease through the notification made by the notification unit (30).

The sensor information processing unit (24) may further be configured to, based on the detection signal, calculate the magnitude of the pressure in the area to which the pressure is being applied, and the estimation table stored in the storage unit (20) may associate together the area where the foreign object is present, the magnitude of the pressure in the area to which the pressure is being applied, and the kind of foreign object. The estimation unit can thus estimate the kind of foreign object more accurately.

The foreign object detecting device (12) may further include: the operation unit (32) with which the operator teaches, when the judgement unit (26) judges that the foreign object is present, whether the presence of the foreign object matters; and the update unit (34) configured to update the basic layout information by reflecting therein the foreign object whose presence has been taught as not mattering through the operation unit (32). Thus, the operator can include the area of that foreign object, whose presence he or she has reported as having no problem, in the basic layout information as a predetermined area.

The foreign object detecting device (12) may further include the robot control unit (36) configured to control a robot that transfers the foreign object out of the detection area (16). The operator can then easily remove the foreign object from the detection area (16) by instructing the robot to transfer the foreign object.

What is claimed is:

1. A foreign object detecting device comprising a processor that executes a computer-executable command stored in a memory,
    wherein a detection signal is input to the processor from a sheet-type pressure sensor for which a pressure detection area is a given work space of an industrial machinery, and
    wherein the processor, by executing the computer-executable command, causes the foreign object detecting device to:
        generate, based on the detection signal input, sensor information indicating, in the pressure detection area, an area to which a pressure is being applied; and
        compare the sensor information and layout information indicating a predetermined area that indicates a predetermined arrangement of objects in the pressure detection area, to thereby judge whether a foreign object is present in the pressure detection area.

2. The foreign object detecting device according to claim 1, wherein the processor, by further executing the computer-executable command, causes the foreign object detecting device to:
    when it is judged that the foreign object is present, notify an operator that the foreign object is present in the pressure detection area.

3. The foreign object detecting device according to claim 2, wherein the processor, by further executing the computer-executable command, causes the foreign object detecting device to:
    when it is judged that the foreign object is present, generate a foreign object map that graphically shows an area where the foreign object is present in the pressure detection area, and
    display the foreign object map.

4. The foreign object detecting device according to claim 3, wherein the foreign object map that is generated only shows a difference between the sensor information and the layout information.

5. The foreign object detecting device according to claim 3, wherein the processor, by further executing the computer-executable command, causes the foreign object detecting device to:
    generate the foreign object map that shows both of the area where the foreign object is present and the predetermined area in the layout information, and
    display the foreign object map in a manner that the area where the foreign object is present and the predetermined area is distinguishable from each other.

6. The foreign object detecting device according to claim 2, wherein the memory stores an estimation table in which an area where the foreign object is present and a kind of the foreign object are associated with each other,
    wherein the processor, by further executing the computer-executable command, causes the foreign object detecting device to:
        when it is judged that the foreign object is present, estimate the kind of the foreign object by referring to the estimation table,
        make a notification of the kind of the foreign object estimated.

7. The foreign object detecting device according to claim 6, wherein the processor, by further executing the computer-executable command, causes the foreign object detecting device to, based on the detection signal, calculate a magnitude of the pressure in the area to which the pressure is being applied, and
    wherein the estimation table stored in the memory associates together the area where the foreign object is present, the magnitude of the pressure in the area to which the pressure is being applied, and the kind of the foreign object.

8. The foreign object detecting device according to claim 2, wherein the processor, by further executing the computer-executable command, causes the foreign object detecting device to:
    teach, when it is judged that the foreign object is present, whether the presence of the foreign object matters; and
    update the layout information by reflecting therein the foreign object whose presence has been taught as not mattering.

9. The foreign object detecting device according to claim 2, wherein the processor, by further executing the computer-executable command, causes the foreign object detecting device to:
    control a robot that transfers the foreign object out of the pressure detection area.

10. A foreign object detecting device comprising:
    a display device;
    a calculation unit including a processor; and
    a storage unit including a memory,
    wherein a detection signal is input from a sheet-type pressure sensor to the processor,
    wherein, based on the detection signal input to the processor, the memory stores instructions to cause the processor to generate sensor information indicating an area in a pressure detection area of the pressure sensor to which a pressure is being applied,
    wherein the memory stores instructions to cause the processor to compare the sensor information and layout information indicating a predetermined area in the pressure detection area to which a pressure is applied, to thereby judge whether a foreign object is present in the pressure detection area, wherein the memory stores instructions to cause the processor to, when the foreign object is judged as present, notify an operator that the foreign object is present in the pressure detection area, wherein the memory stores instructions to cause the processor to, when the foreign object is judged as present, generate a foreign object map that graphically shows an area where the foreign object is present in the pressure detection area, and wherein the display device displays the foreign object map based on the processor generating the foreign object map.

11. The foreign object detecting device according to claim 10, wherein the memory stores instructions to cause the processor to generate the foreign object map that only shows a difference between the sensor information and the layout information.

12. The foreign object detecting device according to claim 10, wherein the memory stores instructions to cause the processor to generate the foreign object map that shows both of the area where the foreign object is present and the predetermined area in the layout information, and wherein the display device is configured to display the foreign object map in a manner that the area where the foreign object is present and the predetermined area is distinguishable from each other.

13. A foreign object detecting device comprising:
a display device;
a calculation unit including a processor; and
a storage unit including a memory,
wherein a detection signal is input from a sheet-type pressure sensor to the processor,
wherein, based on the detection signal input to the processor, the memory stores instructions to cause the processor to generate sensor information indicating an area in a pressure detection area of the pressure sensor to which a pressure is being applied, wherein the memory stores instructions to cause the processor to compare the sensor information and layout information indicating a predetermined area in the pressure detection area to which a pressure is applied, to thereby judge whether a foreign object is present in the pressure detection area, wherein the memory stores instructions to cause the processor to, when the foreign object is judged as present, notify an operator that the foreign object is present in the pressure detection area, wherein the memory stores an estimation table in which an area where the foreign object is present and a kind of the foreign object are associated with each other, wherein the memory stores instructions to cause the processor to, when the foreign object is judged as present, estimate the kind of the foreign object by referring to the estimation table, wherein the memory stores instructions to cause the processor to make notification of the kind of the foreign object estimated.

14. The foreign object detecting device according to claim 13, wherein the memory further stores instructions to cause the processor to, based on the detection signal, calculate a magnitude of the pressure in the area to which the pressure is being applied, and wherein the estimation table stored in the memory associates together the area where the foreign object is present, the magnitude of the pressure in the area to which the pressure is being applied, and the kind of the foreign object.

* * * * *